United States Patent
Furuuchi et al.

[15] 3,660,137
[45] May 2, 1972

[54] HEAT-REFLECTING GLASS AND METHOD FOR MANUFACTURING THE SAME

[72] Inventors: Shigemasa Furuuchi; Katsuaki Aikawa, both of Kanagawa-ken, Japan

[22] Filed: June 13, 1969

[21] Appl. No.: 832,991

[30] Foreign Application Priority Data

June 25, 1968 Japan....................................43/43597

[52] U.S. Cl. ......................117/33.3, 117/68, 117/71 R, 117/124 H, 117/124 C, 117/160 R, 161/196, 350/1
[51] Int. Cl............................................................C03c 17/10
[58] Field of Search.....................117/33.3, 124, 160; 350/1; 161/196

[56] References Cited

UNITED STATES PATENTS

| | | | |
|---|---|---|---|
| 2,768,909 | 10/1956 | Haslam | 117/33.3 X |
| 3,069,301 | 12/1962 | Buckley et al. | 350/1 |
| 3,087,831 | 4/1963 | Browne | 117/124 X |
| 3,266,912 | 8/1966 | Murphy | 117/124 X |
| 3,407,081 | 10/1968 | Ballard | 117/124 X |
| 3,400,006 | 9/1968 | Berning et al. | 117/33.3 |
| 3,440,062 | 4/1969 | Hoffman | 117/160 |

OTHER PUBLICATIONS

Hopper, " How to Apply Noble Metals to Ceramics," Ceramic Industry, 6/63 Vol. 80, No. 6 pp. 65– 68

*Primary Examiner*—William D. Martin
*Assistant Examiner*—Mathew R. P. Perrone, Jr.
*Attorney*—Kurt Kelman

[57] ABSTRACT

On the surface of a glass substrate is formed by hydrolysis or thermal decomposition a light-transmissive film of a metallic oxide having a refractive index higher than that of glass and colloidal particles of metallic palladium or of metallic palladium and metallic gold, said particles being uniformly dispersed in said metallic oxide. The film has the transmission color of bluish gray, neutral gray or yellowish gray and is capable of reflecting about 30 to 40 percent of solar energy radiation. The film also has superior mechanical strength and chemical stability, so that glass having such a film can be successfully used as a heat-reflecting glass in single-pane installations.

6 Claims, 2 Drawing Figures

INVENTORS
SHIGEMASA FURUUCHI
BY KATSUAKI AIKAWA

AGENT

HEAT-REFLECTING GLASS AND METHOD FOR MANUFACTURING THE SAME

BACKGROUND OF THE INVENTION

1. Field of the Invention

This invention relates to a heat-reflecting glass having on the surface a film capable of reflecting and shielding out the thermal energy contained in light rays and particularly in solar radiation, said film having been formed on either surface, on one surface only or in a localized area of the surface of the glass substrate, and a process for the manufacture of such glass.

2. Description of Prior Art

As sheet glass for use as window panes or windshields, in the openings in buildings and other large structures as well as in vehicles such as automobiles, there is known a heat-reflecting glass which is capable of reflecting the thermal energy of solar radiation and preventing inflow of the heat.

By current standards, a glass sheet on which a thin continuous film of metallic gold has been deposited by vacuum deposition is generally accepted as the best heat-reflecting glass. However, metallic gold adheres to glass surfaces only with considerable difficulty and the resulting film leaves much to be desired in mechanical strength and hardness.

For this reason the metallic gold film must be protected by an additional glass member. Such a heat-reflecting glass must therefore be manufactured or put to use in the form of laminated glass or as a double glazed glass unit. This entails considerable increases in both weight and bulk of the product, and, accordingly, increased production cost.

Furthermore, application of the vacuum deposition technique to the formation of a thin film involves the use of large-scale equipment and complicated procedures, which result in low production efficiency.

The same disadvantages are encountered in the production and use of other types of heat-reflecting glass possessing continuous films of other metals such as copper, platinum and silver.

Some of the above problems are solved by copending U.S. patent application Ser. No. 551,566, filed May 20, 1966, replaced by continuation application Ser. No. 866,100, filed Oct. 6, 1969. This application relates to a heat-ray reflecting film deposited on glass by hydrolysis or thermal decomposition, said film being composed of a metallic oxide having a refractive index higher than that of glass, such as $TiO_2$, $Ta_2O_5$, $WO_3$, $ZrO_2$, $ThO_2$, $SnO_2$, or $Nb_2O_5$, and metallic gold and/or metallic platinum which are uniformly dispersed in said metallic oxide in microscopically divided form. This film is superior in mechanical strength and chemically stable, so that it can be used as heat-reflecting glass and particularly as solar energy shielding glass. However, the use of extremely expensive platinum is not economically advantageous.

SUMMARY OF THE INVENTION

The primary object of this invention is to provide a heat-reflecting glass which has a film of the described type on the surface, said film not only possessing an excellent heat-reflecting performance but also being highly resistant to abrasion, scratching or degradations even upon direct exposure to the outside atmosphere.

Another object of this invention is to provide a glass having on the surface a film with the transmission color of neutral or orangy gray, as well as excellent coloring property, superior heat-ray reflecting performance and excellent mechanical and chemical properties.

Still another object of the invention is to provide a process for producing a heat-reflecting glass of the described type without resort to a special atmosphere, intricate equipment and complicated processing techniques.

Other objects and advantages of the invention will become apparent from the following description.

It has been found that the above-mentioned objects of the invention may be accomplished by dispersing uniformly metallic palladium in a microscopically divided state into a film of a metallic oxide which has a refractive index higher than that of the glass substrate on which it is being deposited.

The heat-reflecting glass according to this invention comprises a glass substrate, a light-transmissive film disposed on the surface thereof, said light-transmissive film being composed essentially of a metalic oxide having a refractive index higher than that of substrate glass and microscopically divided particles of metallic palladium which are uniformly dispersed in said metallic oxide.

Hydrolysis or thermal decomposition is the most advantageous method for depositing such a film on the surface of glass. Thus, a compound which will form said metallic oxide upon heating and a compound capable of liberating metallic palladium on heating are dissolved in a solvent, and the glass substrate is coated with the resulting solution. This coated glass is then baked, whereupon a heat-reflecting film of the described type is formed on the surface of the glass.

BRIEF DESCRIPTION OF THE DRAWINGS

Referring to FIGS. 1 and 2, the percent transmission and reflection values are plotted on the vertical axes, against wavelengths in $m\mu$ on the horizontal axes. Figures accompanying the curves correspond to the serial numbers of glass samples described in Example I which appears hereinafter.

DESCRIPTION OF PREFERRED EMBODIMENTS

Figure 1:
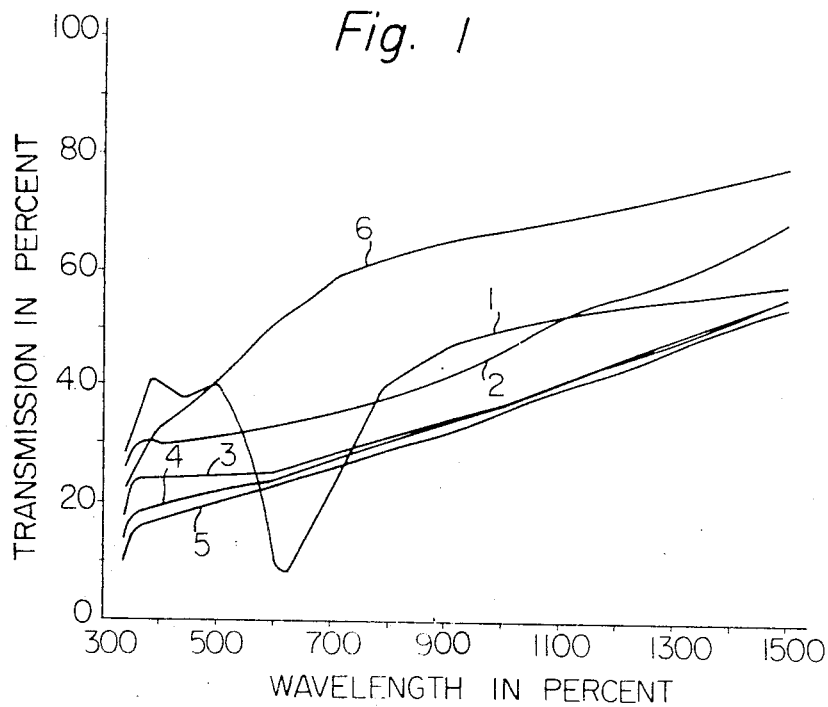
FIGS. 1 and 2 show the spectral transmission and reflection characteristics, respectively, of a heat-reflecting glass embodying the principles of this invention at wavelengths in the visible to near infrared region.

The heat-reflecting film according to this invention consists essentially of a metallic oxide having a refractive index higher than that of glass and metallic palladium dispersed in said metallic oxide uniformly and in a microscopically divided state. This film features the transmission color of yellowish or orangy gray but its coloring property, that is to say, reduction in light transmission per unit thickness is relatively low.

In order to enhance the coloring property of such a film, we have discovered that the presence of metallic gold along with metallic palladium is highly beneficial. The amount of metallic gold for use in this application should be about 0.1 to about 20 times the amount of metallic palladium by weight and, preferably, from about 0.5 to about five times. The film containing both metallic palladium and metallic gold has the transmission color of yellowish gray to neutral gray further to bluish gray in the order of an increasing gold content.

The mechanism by which this invention produces a film of superior heat-reflecting performance remains yet to be fully elucidated, but it is believed that this improved performance is a synergistic result between the light interference effect of the metallic oxide having a refractive index higher than that of glass and light-absorbing effect of the metallic particles of palladium or of palladium and gold which are dispersed uniformly in the oxide matrix in a microscopically divided or colloidal state.

It has been found that when use is made of a metallic oxide having a refractive index lower than glass as a matrix material in which said metallic particles are dispersed, the light interference effect of the matrix impedes the heat-reflecting performance of the metallic particles.

In accordance with this invention, therefore, the matrix is composed essentially of a metallic oxide having a refractive index higher than that of glass. As specific examples of the metallic oxide which has a refractive index higher than that of glass and accordingly can be suitably employed as a principal component of the matrix, it has been found from studies in optical properties, adhesiveness to glass, mechanical properties and chemical stabilities that $TiO_2$, $Ta_2O_5$, $WO_3$, $ZrO_2$, $ThO_2$, $SnO_2$ and $Nb_2O_5$ are particularly suitable. These metallic oxides can be used either singly or in combination, but among them $TiO_2$ is best by any of the above criteria.

While there is no specific restriction upon the amount of the metallic component (metallic Pd or metallic Pd and Au) contained in the film according to this invention, the preferred amount is 2 to 60 percent by weight (about 0.4 to 23 percent by volume) and, for better results, 4 to 50 percent by weight (about 0.8 to 17 percent by volume). If the proportion of the metallic component is below the lower limit, the heat-reflecting performance of the film will be inadequate, while proportion in excess of the upper limit will result in inadequate adhesiveness and mechanical strength.

In addition to the metallic oxide which is used as a principal component of the matrix, it is permissible to incorporate minor proportions of such additives as $SiO_2$ and/or $Bi_2O_3$.

Addition of $SiO_2$ makes the surfaces of the film harder and smoother, while addition of $Bi_2O_3$ leads to a reduced transmission of ultraviolet rays and, accordingly an improved ultraviolet shielding effect. The additives can be added in amounts from 0.5 to 30 percent by weight and, for better results, from 2 to 10 percent by weight, based on the metallic oxide.

The following description deals with a process for the formation of the film described hereinbefore on a glass substrate.

In the first place, a coating solution is prepared. A soluble palladium compound and, if required, a soluble gold compound are dissolved in a solvent, together with a soluble metallic compound which is capable of forming a metallic oxide which is to constitute the above-mentioned matrix. The surface of a glass substrate is coated with the above solution, and the coated glass is baked at a temperature from about 400° C to the softening point of the glass. In the process the solvent is evaporated and the palladium compound is decomposed to yield metallic palladium (and metallic gold), while the other metallic compound decomposes into the corresponding metallic oxide.

In this manner, a film in which the metallic component is uniformly dispersed as colloidal particles within the metallic oxide is formed in intimate contact with the surface of the glass substrate.

The palladium compound to be used in the preparation of said solution is preferably the chloride of divalent palladium, although other soluble salts of divalent palladium such as the nitrate and sulfate, palladium resinate, and palladium-alkyl mercaptides such as palladium-ethyl mercaptide can likewise be employed. The gold compound is preferably chloroauric acid, but such other compounds as gold-alkyl mercaptides, e.g. gold-ethyl mercaptide, gold-propyl mercaptide, as well as alkyl gold halides, e.g. diethyl monobromo-gold can be employed as well.

The compounds, which on heating can become said metallic oxide, e.g. the oxide of Ti, Ta, W, Zr, Th, Sn, Nb, Si or Bi, include such metallic acid esters as tetra-butyl titanate, tetraisopropyl titanate, ethyl silicate, halogenides, nitrates, acetates, sulfates, complex salts and the like.

While those compounds of palladium and of gold, as well as the metallic oxides mentioned above, can be dissolved in water, use of aqueous solutions is not desirable from the standpoints of solution stability and the wettability of the glass surface.

In accordance with the invention, the above-mentioned compounds are preferably dissolved in organic solvents such as alcohols, acetone, esters, alicyclic compounds, and aromatic compounds, or for better results, in lower aliphatic alcohols such as methanol, ethanol, propanol, butanol and the like.

It is permissible to incorporate in the solutions suitable additives for such purposes as adjusting the wettability of the glass surface with the solution, improving the homogeniety of the solution and adjusting the viscosity or pH of the solution.

In preparing a solution that will yield a film containing both metallic gold and metallic palladium, the concentration of the gold compound, as Au (hereinafter called Au concentration), in the solution is preferably 0.1 to 20 times by weight relative to the concentration of the palladium compound (hereinafter called Pd concentration). While the Au compound in the solution is decomposed to yield metallic gold when the glass coated with the solution is heated, it is presumed that, in this process, the Au serves as a growth catalyst or nucleating agent for the metallic palladium particles being deposited on the glass surface.

Stated differently, in the course of heating, microscopically fine particles or nuclei of metallic gold are first formed and, then, around or in the vicinity of those particles, metallic palladium particles precipitate and grow. The metallic particles produced in this manner are apparently different from the particles of palladium alone in optical properties, having in particular, an increased light absorption.

For the above reason, it is believed that use of a solution containing the gold compound yields a film which features a good coloring property, that is to say, a film which has a lower transmission and a deep color.

If the gold concentration of the solution is lower than 0.1 times relative to the palladium concentration, there will be no improvement in coloring property, while if the gold concentration is beyond 20 times, the transmission color of the resulting film will be blue. Thus, those two extremes are undesirable. For better results, the above-mentioned proportion should be further limited to the range of about 0.5 to about 5 percent.

The concentration of the palladium compound in the solution vary rather widely, but if the concentration is too low, the transmission color of the film will be too faint. Therefore, the concentration of the palladium compound, as Pd, should be at least 0.4 g/l and, usually, about 2 g/l to 20 g/l.

It is to be understood that the concentration of the above-mentioned other compound in the solution should be selected according to the expected proportion thereof in the form of oxide in the film.

The solution prepared in the described manner is used in the coating of glass. Thus, a glass sheet is dipped in the solution and, then, slowly raised out of the solution, whereby a homogeneous layer of the coating is formed on the surface of the substrate. The coated glass is then dried at room temperature or at an elevated temperature from 100° to 200° C. It is to be understood that any other similar coating technique such as spraying or roll coating can also be utilized with success.

The glass is then heated at temperatures over about 400° C and below its softening point, preferably from 450° to 800° C, for a duration of about 10 minutes. The thickness of the resulting film can be adjusted as desired by regulating the concentrations of the solutes (i.e. the Pd compound, Au compound and other compound) in the solution and the amount of deposition of the solution on the substrate. For practical purposes, the film preferably ranges, in thickness, from about 100 A to 1,500 A and, for better results, from 300 A to 800 A.

The film thickness should not exceed 1,500 A, for an undesirable iridescent color will then be produced in the film. On the other hand, a film less than 100 A in thickness does not possess a sufficiently high heat-reflecting performance.

In carrying the invention into practice, the metallic oxide film which contains metallic particles (hereinafter called "main film") may be used in combination with one or more different types of films to produce a double-layer or multiple-layer film on the glass surface.

For instance, through the deposition of an intermediate layer (underlayer film) composed solely of metallic oxide (e.g. $TiO_2$, $Ta_2O_5$, $WO_3$, $ZrO_2$, $ThO_2$, $SnO_2$ or $Nb_2O_5$) between the main film and the glass surface, it is possible to improve the mechanical strength or/and adhesiveness of the main film.

And when the under-layer is made predominantly of a metallic oxide, e.g. $SiO_2$, which has a refractive index lower than that of glass, the heat-reflecting performance and visible transmission characteristic of the product are improved through a light interference effect among the under-layer film, the glass and the main film which has a higher refractive index.

To obtain an under-layer film of the type described, the substrate glass surface is coated with a solution containing the required metallic compound and the resulting coated glass is dried and/or heated and finally baked. Thereafter, the glass is further treated with a main film forming solution to obtain the main film as a surface layer.

The glass substrates to which this invention can be applied to advantage include, for example, soda-lime glass, potash glass, borosilicate glass, barium crown glass, quartz glass, other transparent, opaque or colored glass, heat-absorbing glass and the like, irrespective of their compositions and types.

As regards the shape of the glass substrate, this invention can be applied to any shape of glass, such as plane sheet glass, curved sheet glass, optical lenses, spectacle lenses and the like.

The following examples are given to further illustrate this invention, it being understood that the invention is by no means limited thereto.

Example 1

Six different solutions were prepared according to the formulas shown in Table 1. Sample No. 1 was a control solution prepared by dissolving tetra-isopropyl titanate (Ti($C_3H_7O$)$_4$) and hydrated chloroauric acid (HAuCl$_4$·xH$_2$O; the value of $x$ unavailable, but the acid contains 50 percent by weight of Au) in a mixture of ethanol and n-butanol. The other samples, numbered, 2, 3, 4 and 5, contained various amounts of palladium chloride (PdCl$_2$). In Sample No. 6 the tetraisopropyl titanate and palladium chloride were dissolved in the same solvent.

TABLE I

| Ingredient | Example No. | | | | | |
|---|---|---|---|---|---|---|
| | 1 | 2 | 3 | 4 | 5 | 6 |
| Ti(OC$_3$H$_7$)$_4$ | 18 g | 18 g | 18 g | 18 g | 18 g | 18 g |
| PdCl$_2$ | — | 1.0g | 2.0g | 3.0g | 4.0g | 4.0g |
| HAuCl$_4$·xH$_2$O | 3.9g | 6.0g | 6.0g | 6.0g | 6.0g | — |
| Ethanol | 67cc | 67cc | 67cc | 67cc | 67cc | 67cc |
| n-Butanol | 133cc | 133cc | 133cc | 133cc | 133cc | 133cc |

Soda lime glass sheets, 3 mm thick and 30 by 30 cm, were thoroughly washed and dried. Then, the sheets were dipped in the solutions and slowly raised out of the solutions at the rate of about 15 cm/minute. In this manner, both surfaces of each glass sheet were evenly coated with the corresponding solution. The coated glass surfaces were dried by heating at 200° C for 10 minutes, at the end of which time the sheet was heated in a muffle furnace at 680° C for 10 minutes, whereupon the films were firmly baked onto the surfaces.

Figure 2:
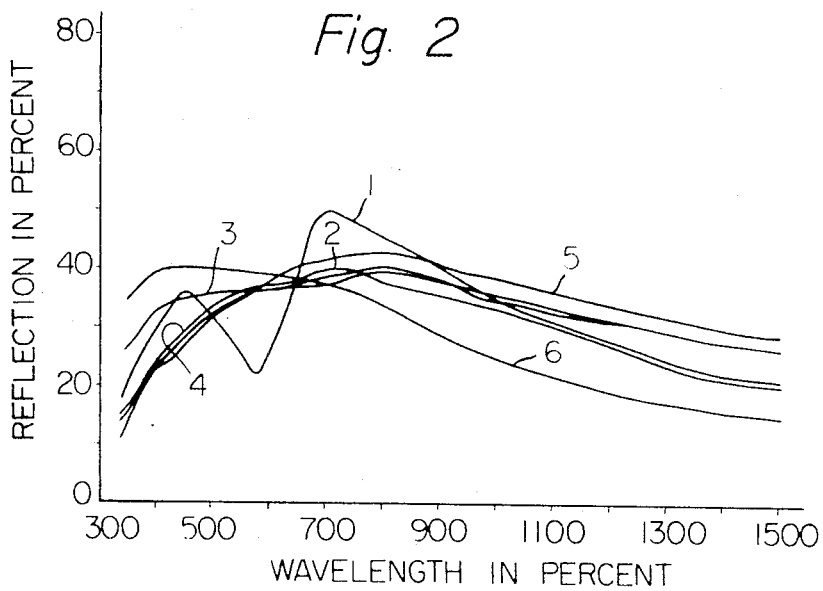

The thickness of each film so formed was about 500 A. The spectral transmission and reflection characteristic curves of those six glass samples are reproduced in Figs. 1 and 2, respectively.

Table II below show the solar energy transmissivity ($T_E$), solar energy reflectivity ($R_E$), visual transmissivity ($T_V$) and visual reflectivity ($R_V$), all in percentage, for those samples, as calculated from the above spectral transmission and reflection curves.

TABLE II

| Example No | 1 | 2 | 3 | 4 | 5 | 6 |
|---|---|---|---|---|---|---|
| Transmission color | Greenish blue | Bluish gray | Neutral gray | Orangy gray | Orangy gray | Yellowish gray |
| TE in percent | 40 | 40 | 35 | 33 | 32 | 55 |
| RE in percent | 37 | 35 | 35 | 35 | 35 | 32 |
| TV in percent | 27 | 32 | 26 | 24 | 23 | 47 |
| RV in percent | 26 | 36 | 35 | 36 | 36 | 38 |

The glass sample designated No. 1, which had a TiO$_2$ film containing particles of metallic gold alone on either surface, showed the transmission color of greenish blue. In contrast, the samples designated No. 2 through No. 5 had the transmission color of substantially neutral gray, thus attesting to a synergistic result of metallic palladium and gold. Comparison of the glass sample No. 1 or No. 6, which contained only metallic gold or metallic palladium alone, with glass samples No. 3 through No. 5, which respectively have on either surface a film containing both metallic palladium and gold, shows reductions in light transmission for the latter samples, evidencing the improved coloring property of glass due to the concurrent presence of metallic palladium and metallic gold.

The mechanical and chemical properties of the films of the six glass samples prepared in the above manner are as follows. Mechanical strength of a film: Neither the pen tip nor a razor blade could damage the films. On Mohs' scale, the hardness values of the films could be placed between 5 and 6.

After a scratch resistance test in which each sample was moved back and forth against a pencil eraser which contained glass powder under a load of 633 g/cm$^2$, the increase in visible transmission of the film was only less than 1 percent.

Chemical stability of the film: As a weathering test, each sample was treated in a Weather-O-Meter for 2,000 hours (corresponding to 10 years of atmospheric exposure). There was no detectable change in color of the film in the visible region.

When the sample was treated in water or 0.1 N oxalic acid at 80° C for 5 hours, no change in its color was observed.

The above data indicate that the heat-reflecting glass of this invention can be successfully used in single-pane application.

Example II

Six different solutions were prepared according to the formulas shown below in Table III.

TABLE III

| Ingredient | Sample No. | | | | | |
|---|---|---|---|---|---|---|
| | 7 | 8 | 9 | 10 | 11 | 12 |
| TaCl$_5$ | 4 gr | — | — | — | — | — |
| NbCl$_5$ | — | 5 g | — | — | — | — |
| Th(NO$_3$)·4H$_2$O | — | — | 10 g | — | — | — |
| ZrCl$_4$ | — | — | — | 5 g | — | — |
| SnCl$_4$ | — | — | — | — | 5 g | — |
| WCl$_6$ | — | — | — | — | — | 7 g |
| HAuCl$_4$·xH$_2$O | 3 gr | 3 gr | 3 gr | 3 gr | 3 gr | 3 gr |
| PdCl$_2$ | 1 gr | 1 gr | 1 gr | 1 gr | 1 gr | 1 gr |
| Si(OC$_2$H$_5$)$_4$ | 1 cc | 1 cc | 1 cc | 1 cc | 1 cc | 1 cc |
| HNO$_3$ | 1 cc | 1 cc | 1 cc | 1 cc | 1 cc | 1 cc |
| Ethanol | 33 cc | 33 cc | 33 cc | 33 cc | 33 cc | 33 cc |
| n-Butanol | 67 cc | 67 cc | 67 cc | 67 cc | 67 cc | 67 cc |

The solutions designated No. 7 through No. 12 corresponded to the solution designated No. 3 in the above Table I in which the Ti(OC$_3$H$_7$)$_4$ had been replaced by other metallic compounds capable of forming metallic oxides on heating and small amounts of additives, i.e. ethyl silicate Si(OC$_2$H$_5$)$_4$ and HNO$_3$, had been further incorporated. It is to be understood that HAuCl$_4$·xH$_2$O contained 50 percent by weight of Au.

In the same manner as Example I, a film about 500 A thick was formed on either surface of each glass sheet 3 mm thick and 30 by 30 cm.

The resulting six glass samples had the transmission color of neutral gray and their spectral transmission and reflection characteristics were substantially identical with those of the above-mentioned No. 3 sample. Thus, the values of $T_E$ ranged from about 35–40 percent, $R_E$ values from about 30 to 35 percent, $T_V$ from about 26 to 30 percent, and Rv from about 30 to 35 percent. The mechanical strength and chemical stability values of those samples were also substantially identical with those of the No. 3 sample.

Example III

Two different solutions were prepared according to the formulas shown below in Table IV.

In those solutions, tetra-butyl titanate was used as the Ti compound, and organic solvents other than alcohol were also used. In addition, small amounts of ethyl silicate, $HNO_3$ and HCl were also incorporated in the solutions. The No. 14 solution also contained a small amount of $BiCl_3$. The other ingredients were the same as those used in No. 3.

TABLE IV

| Ingredient | Sample No 13 | 14 |
| --- | --- | --- |
| $Ti(OC_4H_9)_4$ | 10 g | 10 g |
| $HAuCl_4 \cdot xH_2O$ | 3 g | 3 g |
| $PdCl_2$ | 1 g | 1 g |
| $Si(OC_2H_5)$ | 1 cc | 1 cc |
| $BiCl_3$ | — | 1 g |
| HCl | 3 cc | 3 cc |
| $HNO_3$ | 1 cc | 1 cc |
| Cyclo hexane | 20 cc | — |
| Ethanol | 20 cc | — |
| Iso-propanol | 50 cc | 70 cc |
| Ethyl propionate | — | 20 cc |

The surfaces of each glass sheet 3 mm thick and 30 by 30 cm were coated in the same manner as in Examples I and II, whereby a film about 500 A thick was formed on either surface.

It was found that the glass sample designated No. 13 was substantially comparable to the No. 3 glass sample in optical, mechanical and chemical properties.

The No. 14 sample was substantially identical with No. 3 and No. 13 samples in optical, mechanical and chemical characteristics, but its spectral transmission curve revealed a decrease in transmission in the wavelength region shorter than 360 m$\mu$.

Thus, there was a drop of about 5 percent at 340 m$\mu$, thus attesting to a shielding effect against ultraviolet light.

What is claimed is:

1. A method of producing a heat-reflecting glass, which comprises the steps of dissolving in an organic solvent selected from the group consisting of alcohols, acetone, esters, alicylic compounds and aromatic compounds a compound capable of forming metallic palladium on heating and a compound capable of forming on heating a metallic oxide having a refractive index higher than that of the glass, the proportion of the first-mentioned compound and the other compound in the solution being from 2:98 to 60:40, by weight, calculated as metallic palladium and metallic oxide, respectively, and the concentration of the first-mentioned compound being at least 0.4 g/l, calculated as metallic palladium; coating a surface of a glass substrate with the solution; and heating the coated glass to a temperature sufficient to decompose the first-mentioned compound until a light-transmissive film having a thickness of about 100 A to 1,500 A and consisting essentially of a matrix of the metallic oxide and colloidal particles of the metallic palladium uniformly dispersed in the metallic oxide matrix in a microscopically divided state is formed on the substrate.

2. A heat-reflecting glass manufactured by the method of claim 1.

3. The method as claimed in claim 1, wherein said compound capable of forming on heating a metallic oxide having a refractive index higher than the glass is a soluble compound selected from the group consisting of the halides, nitrates, metallic acid esters, sulfates and acetates of Ti, Ta, W, Zr, Th, Sn and Nb.

4. The method as claimed in claim 1, wherein the concentration of the first-mentioned compound in between about 2 g/l and 20 g/l.

5. A method of producing a heat-reflecting galss, which comprises the steps of dissolving in an organic solvent selected from the group consisting of alcohols, acetone, esters, alicylic compounds and aromatic compounds a first compound capable of forming metallic palladium on heating, a second compound capable of forming metallic gold on heating, and a third compound capable of forming on heating a metallic oxide having a refractive index higher than that of the glass, the proportion of the combined first and second compounds and the third compound in the solution being from 2:98 to 60:40, by weight, calculated as combined metallic palladium and gold and as metallic oxide, respectively, the concentration of the first compound being at least 0.4 g/l, calculated as metallic palladium, and the concentration of the second compound being 0.1 to 20 times, by weight, the concentration of the first compound, calculated as metallic palladium and metallic gold, respectively; coating the surface of a glass substrate with the solution; and heating the coated glass to a temperature sufficient to decompose the first and second compounds until a light-transmissive film having a thickness of about 100 A to 1,500 A and consisting essentially of a matrix of the metallic oxide and colloidal particles of the metallic palladium and metallic gold uniformly dispersed in the metallic oxide matrix in a microscopically divided state is formed on the substrate.

6. The method as claimed in claim 5, wherein said compound capable of forming on heating a metallic oxide having a refractive index higher than glass is a soluble compound selected from the group consisting of the halides, nitrates, metallic acid esters, sulfates and acetates of Ti, Ta, W, Zr, Th, Sn and Nb.

* * * * *

UNITED STATES PATENT OFFICE
CERTIFICATE OF CORRECTION

Patent No. 3,660,137                  Dated May 2, 1972

Inventor(s) Shigemasa Furuuchi et al

It is certified that error appears in the above-identified patent and that said Letters Patent are hereby corrected as shown below:

On the title page, after "72" insert:--
(73) Assignee: Asahi Glass Co., Ltd., of Tokyo Japan Signed and sealed this 31st day of October 1972.

(SEAL)
Attest:

EDWARD M. FLETCHER, JR.                 ROBERT GOTTSCHALK
Attesting Officer                        Commissioner of Patents